United States Patent [19]
Arehart et al.

[11] Patent Number: 4,643,056
[45] Date of Patent: Feb. 17, 1987

[54] CHIP BREAKING SYSTEM FOR AUTOMATED MACHINE TOOL

[75] Inventors: Theodore A. Arehart, Clinton; Donald O. Carey, Oak Ridge, both of Tenn.

[73] Assignee: The United States of America as represented by the United States Department of Energy, Washington, D.C.

[21] Appl. No.: 817,218

[22] Filed: Jan. 7, 1986

[51] Int. Cl.[4] .............................................. B23B 29/24
[52] U.S. Cl. .................................. 82/36 A; 82/34 R; 407/11; 408/56
[58] Field of Search ............... 82/36 A, 34 R; 407/11; 408/56

[56] References Cited

U.S. PATENT DOCUMENTS

| 3,375,742 | 4/1968 | Sturm | 407/11 |
| 3,726,363 | 4/1973 | Sussman | 408/56 |
| 4,164,879 | 8/1979 | Martin | 407/11 |

FOREIGN PATENT DOCUMENTS

| 143093 | 12/1978 | Japan | 82/36 A |
| 2141546 | 12/1984 | United Kingdom | 82/36 A |

Primary Examiner—Leonidas Vlachos
Attorney, Agent, or Firm—Earl L. Larcher; Stephen D. Hamel; Judson R. Hightower

[57] ABSTRACT

The invention is a rotary selectively directional valve assembly for use in an automated turret lathe for directing a stream of high pressure liquid machining coolant to the interface of a machine tool and workpiece for breaking up ribbon-shaped chips during the formation thereof so as to inhibit scratching or other marring of the machined surfaces by these ribbon-shaped chips. The valve assembly is provided by a manifold arrangement having a plurality of circumferentially spaced apart ports each coupled to a machine tool. The manifold is rotatable with the turret when the turret is positioned for alignment of a machine tool in a machining relationship with the workpiece. The manifold is connected to a non-rotational header having a single passageway therethrough which conveys the high pressure coolant to only the port in the manifold which is in registry with the tool disposed in a working relationship with the workpiece. To position the machine tools the turret is rotated and one of the tools is placed in a material-removing relationship of the workpiece. The passageway in the header and one of the ports in the manifold arrangement are then automatically aligned to supply the machining coolant to the machine tool workpiece interface for breaking up of the chips as well as cooling the tool and workpiece during the machining operation.

2 Claims, 5 Drawing Figures

CHIP BREAKING SYSTEM FOR AUTOMATED MACHINE TOOL

This invention was made as a result of work under Contract DE-AC05-84OR21400 between the U.S. Department of Energy and Martin Marietta Energy Systems, Inc.

BACKGROUND OF THE INVENTION

The present invention is directed to a system for breaking ribbon-shaped chips as they are formed during the removal of material from a workpiece with an automated turret lathe.

In the machining of various configured workpieces formed of a metal such as uranium and uranium alloys with machine tools such as a lathe, turnings or chips in the form of long spiral strips or ribbons of workpiece material are generated. These ribbon-shaped chips have a tendency to scrape or otherwise mar the machined surface of the workpiece if they are allowed to remain intact during the machining operation. The formation of these long ribbon-shaped chips when using conventional manually operated machine tools is not of any particular concern since the ribbon-shaped chips can be readily removed by the operator during their formation. However, when using computer programmed or other automated machine tools, especially when the machine tools are enclosed in a housing, access to the workpiece for breaking or removing the chips is restricted so as to present a problem with respect to the generation and removal of the ribbon-like chips.

Several techniques exist for removing the chips from the surface of the workpiece as material is being removed therefrom by the machine tool. For example, as noted above, with a manually operated and controlled machine tool the chips are merely retrieved from the workpiece surface by the operator. In other instances it has been found that a highly pressurized stream of machining coolant can be directed to the interface of the tool and workpiece for breaking the chips immediately after they are formed. The machining coolant also provides for the cooling and lubrication of the material removing tool and workpiece. It has been found that the pressure of the machining coolant required for this fracturing or breaking of the chips varies from metal to metal but can be readily provided in most machining operations without detracting from or otherwise hindering the machining operation. While the use of manual chip-breaking procedures and pressurized machining coolant streams have been used successfully in exposed, manually operated machine tool systems no satisfactory arrangement presently exists in the art which is capable of effectively breaking or removing ribbon-shaped chips in automated machine tools particularly automated rotary turret lathes which employ a plurality of tools during a typical programmed material removing operation while entirely enclosed within a housing.

SUMMARY OF THE INVENTION

Accordingly, it is the primary aim or objective of the present invention to provide in combination with an automated turret lathe a mechanism for breaking or otherwise fracturing the turnings or chips in the form of ribbons or long strips during the formation thereof. The breaking of the chips is achieved by using a pressurized stream of machining coolant directed at the interface of the workpiece and each machine tool on the turret lathe only when the particular tool is in a material-removing relationship with the workpiece so that as the chips are formed they are fragmented into very small pieces which fall harmlessly into a suitable collection basin underlying the machine.

The chip-breaking system of the present invention is used in combination with a turret lathe having a plurality of circumferentially spaced apart stations supporting tool means with the turret being selectively rotated for positioning one of the tool means in a material-removing relationship with a workpiece. Nozzle means are carried by each of the tool means at a location contiguous to the point of contact between a material removing tool on the tool means and the workpiece so that a liquid ejected from the nozzle means impinges at the interface between the workpiece and the tool. A rotary, directional valve assembly comprising manifold and header means is supported by the turret. The manifold means is attached to the turret for rotation therewith and has a plurality of circumferentially spaced apart passageways therein. A plurality of conduit means are attached to the header means and the tool means with each conduit means coupling one of the passageways in the manifold means to one of the nozzle means carried by the tool means. Stationary header means are carried by the manifold means and have a single passageway therein which is in registry with a selected one of the passageways in the manifold means upon rotation of the turret. The selected passageway in the manifold means is the one in registry with the tool means in the material-removing relationship with the workpiece. Further conduit means are coupled to the header means for holding the header means in a stationary position during the rotation of the turret and for serially conveying a liquid through the single passageway in the header means, the passageway in the manifold means in registry with the single passageway, one of the plurality of conduit means, and the nozzle means coupled thereto for impingement upon the material being removed from the workpiece for effecting the breaking thereof.

By utilizing the rotary, directional valve assembly of the present invention any one of the machining tools on the turret can be selectively rotated into the station providing a material-removing relationship with the workpiece and a liquid, i.e., machining coolant, then automatically directed to the interface between the positioned tool and the workpiece for breaking or fracturing the chips prior to the formation of ribbon-like chips.

Another advantage of the present invention is that by breaking these chips into small fragments in uranium metal or uranium alloy machining operations the often present hazardous conditions such as spontaneous combustion associated with such chip formation is substantially minimized.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for the purpose of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

DETAILED DESCRIPTION OF THE INVENTION

As briefly described above, the present invention is directed to an automated rotatable turret lathe wherein the chip breaking system in accordance with the present invention is installed for the purpose of breaking chips or turnings formed during the machining operation prior to the generation of long ribbon-like chips which tend to scratch or otherwise mar the machined surface of the workpiece.

Figure 4:
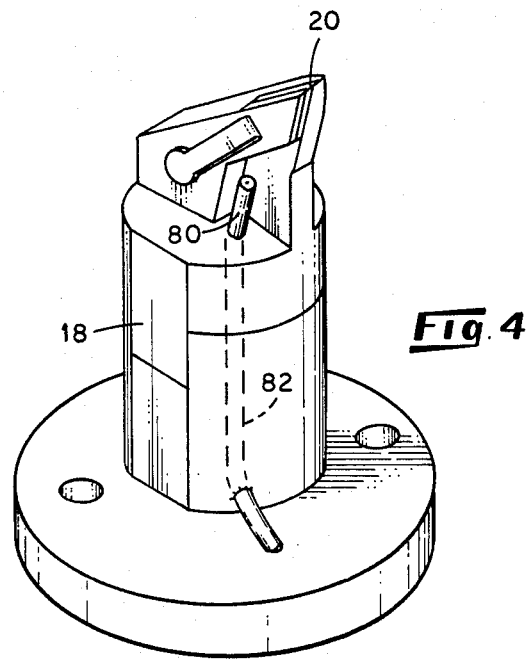
FIG. 4 is a boring bar and nozzle arrangement for removing material from internal surfaces of a workpiece.
Figure 5:
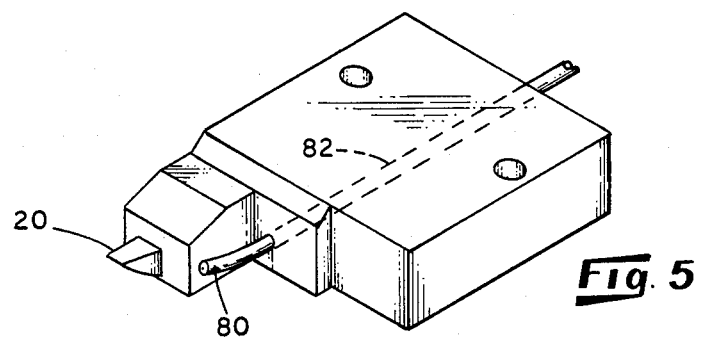
FIG. 5 is a tool with a tool and nozzle arrangement for removing material from the outer surface of a workpiece.

With reference to the accompanying drawings, an automated turret lathe is generally shown at 10 in a working relationship with a workpiece 12 where material is being removed from the outer surface of the workpiece in accordance with a programmed material-removing operation. The turret lathe is normally enclosed in a housing (not shown) to confine the machining coolant spray. During the course of such an operation the turret 10 is rotated to selectively position a sharper machine tool or machine tools of different cutting specifications in a working relationship with the workpiece 12. The workpiece 12, in turn, is shown mounted in a suitable chuck 14 and spindle arrangement 16 for machining outer surfaces with tools such as shown in FIG. 5. Of course, if the turret is provided with boring bars as shown in FIG. 4 for machining the inner surface of a workpiece a different mounting arrangement for the workpiece, as well as known in the art, would be used.

The turret 10 is provided with a plurality of circumferentially spaced apart tool holders 18 disposed in a radial array for supporting material removing tools 20. The segment or member 22 of the turret 10 used for supporting the tool holders 18 on the face or surface 24 thereof is shown in a discoidal configuration but may be of any desired shape. This turret member 22 is rotated about an axis which is perpendicular to the surface 24 of the turret to preferentially position one of the radially oriented tools 20 at a station in which it is provided with a working relationship to the surface of the workpiece 12. Normally the tool indexing of such turret lathes is provided a ring gear arrangement (not shown) disposed inside the turret member 22 near the outer peripheral edge thereof. This ring gear, in turn, meshes with a drive gear (not shown) disposed inside the ring gear so that the turret member 22 may be sequentially rotated to position any tool 20 supported thereby in a desired working relationship with the workpiece 12. The turret 10 is rotatable for positioning the tools 20 at the workpiece 12 and is also reciprocatable along a longitudinal plane coaxial with the rotational axis of the turret 10 during machining of the workpiece. This displacement of the turret 10 can be achieved by a simple mechanism such as ways 26 or any other suitable mechanism which will allow for selective movement of the turret with respect to the workpiece.

Shown mounted on the surface 24 of the turret member 22 are six circumferentially spaced apart tool holders 18, five of which are provided with tools 20 configured for cutting material from outer surfaces of workpieces. The sixth tool holder 18 is shown supporting a sensor 35. A probe 36 projecting from the sensor 35 is utilized to contact the workpiece 12 when the sensor 35 is oriented into the station or position contiguous to the workpiece 12 as generally indicated by numeral 37 and provides a signal indicative of the initial tool position with respect to the workpiece. Once this spatial relationship between the turret 10 and workpiece 12 is determined the turret 10 is rotated to replace the sensor 35 with a tool at position 37.

In order to provide for the breaking up or fracturing of the ribbon-shaped chips as they are formed during the material-removing process with the automated turret lathe a high pressure stream of machining coolant is directed at the interface of the tool 20 and the workpiece 12 (position 37). This high pressure stream of machining coolant provides the necessary lubrication and cooling of the tool bit and workpiece at the point of contact between the tool and the workpiece and also breaks up the ribbon-shaped chips as they form. The breaking up of these chips results in very small fragments which fall into a suitable receptacle underlying the turret lathe for removal from the turret lathe housing. Another advantage to breaking these ribbon-shaped chips into small fragments as provided by the present invention is that the problems associated with ignition of reactive metals such as uranium is substantially negated.

Figure 1:
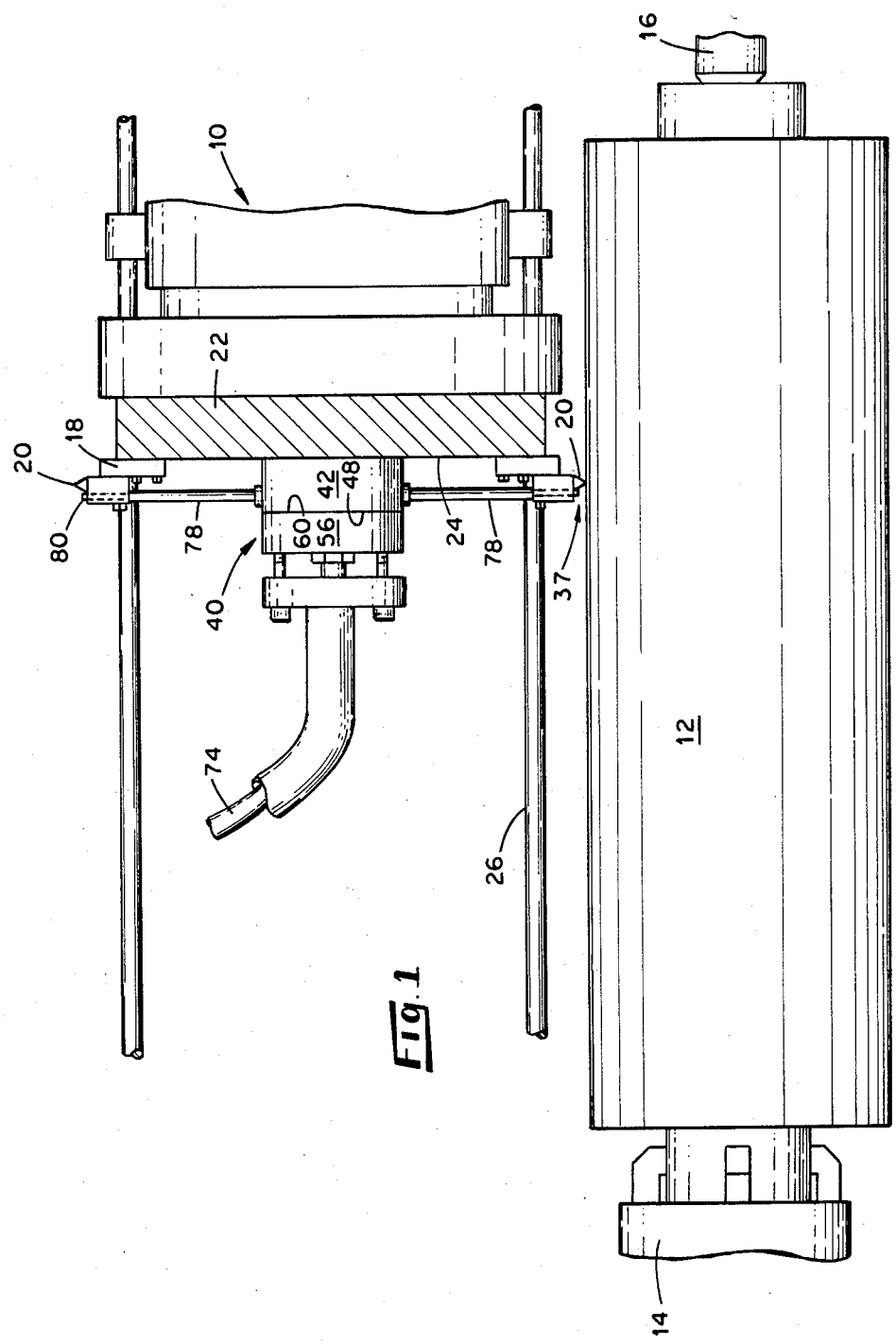
FIG. 1 is a schematic elevational view showing a turret lathe with one of a plurality of tools supported thereby positioned for removing chip-forming material from the outer surface of the workpiece.
Figure 2:
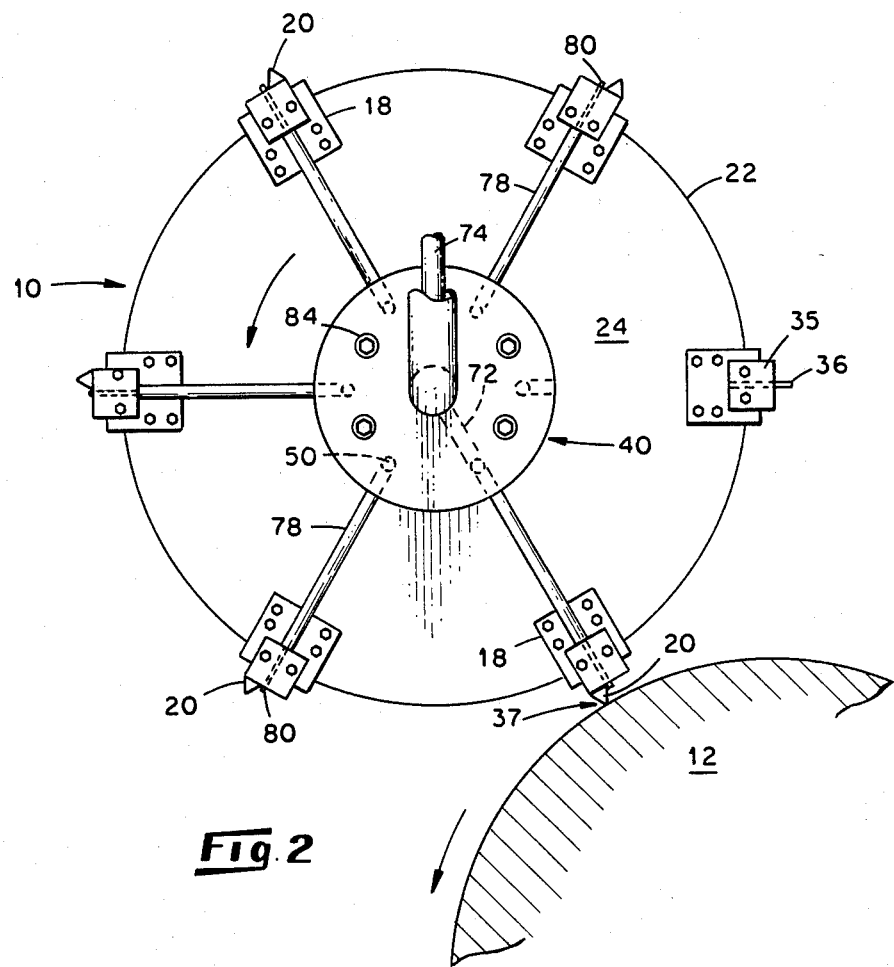
FIG. 2 is an end view of the FIG. 1 embodiment showing the stations on a turret lathe in which tools are carried for selective rotation into a material-removing relationship with a workpiece.

The selected delivery of the high pressure machining coolant to only the tool 20 in position 37 is provided by a rotary valve system 40 having a manifold and header arrangement which is capable of delivering machining coolant to only a single tool 20 with this tool being the one at position 37. The valve system 40 is shown comprising a manifold 42 formed of a base plate 44 attached to the surface 24 of the turret member 22 for rotation therewith about the rotational axis of the turret 10 by a suitable flange arrangement 46. This flange 46 may be bolted or otherwise attached to the turret surface 24. The base plate 44 is shown of a discoidal configuration but can be of any desired configuration and is provided with an outermost planar surface 48 disposed in a plane perpendicular to the rotational axis of the turret 10. The base plate 44 is provided with a plurality of ports 50 (six of which are shown in FIG. 2) which are circumferentially spaced apart about the base plate so as to be generally in alignment with the tool holders 18. The ports 50 are defined by generally L-shaped passageways with one end thereof in registry with the planar surface 48 at a location radially spaced from the central axis and the other end of which is in registry with the peripheral surface of the base plate 44. The ports 50 are shown provided with threads 51 at the peripheral surface for coupling with conduits leading to the tool holders 18 for conveying the pressurized machining coolant as will be described in greater detail below. The base plate 44 of the manifold is also provided with a centrally located bore 52 extending therethrough along the rotational axis of the turret 10. This centrally located passageway 52 is provided with a recess 54 in the base plate 44 at a location remote to the planar surface 48.

To the base plate 44 is attached a header 56 axially spaced therefrom and defined by a plate 58 which is maintained is stationary or non-rotational position during rotation of the turret 10 and manifold 42. Plate 58 is shown in a discoidal configuration similar to that of plate 44 and is provided with a planar surface 60 disposed in a contiguous relationship with the planar surface 48 of the base plate 44. These plates 44 and 58 are held together by a boss 62 which is centrally located on the stationary plate 58 and projects through the centrally located bore 52 in base plate 44. The boss secured to the base plate 44 by a bolt arrangement 64 which is threadedly received in a bore in the end of the boss 62. In order to provide for the relative rotation between the rotatable base plate 44 and stationary plate 58 a suitable washer arrangement 68 may be used under the head 69 of the bolt 64 with the periphery of the washer bearing against the base of recess 54. With the planar surfaces 48 and 60 so held together a suitable seal such as an O-ring as generally shown at 70 is disposed about each of the ports 50 at the interface between the plates 44 and 58 to provide for a liquid-tight seal between the plates 44 and 58 and about each port 50.

In order to provide for the flow of the machining coolant to a selected tool holder 18 the stationary plate 58 of header 56 is provided with a single passageway 72 which has one end thereof radially spaced from the central axis and in registry with the planar surface 10 in alignment with one of ports 50 in base plate 44. The other end of this single passageway 72 is in registry with the surface of the plate 58 opposite the planar surface 60 at the center the plate 58 so as to be in alignment with the rotational axis of the turret 10. This single passageway 72 is coupled to a conduit 74 by a suitable threaded nut arrangement 76. This conduit 74 is, in turn, coupled to a suitable supply of high pressure machining coolant (not shown).

As briefly described above, the ports 50 in the base plate 44 are each coupled to one end of a conduit 78 which is coupled at the other end to a liquid delivery nozzle 80 carried by each tool holder 18. Each nozzle 80 is attached to the tool holder 18 by securing the nozzle 80 within a bore 82 in the tool holder as best shown in FIGS. 4 and 5 or in any other suitable manner which is capable of maintaining the nozzle 80 in such an alignment that a high pressure stream of machining coolant can be directed from the nozzle 80 onto the workpiece at the tool-workpiece interface at station 37 so as to cool the tool 20 and workpiece 12 and break up the chips as they form.

Figure 3:
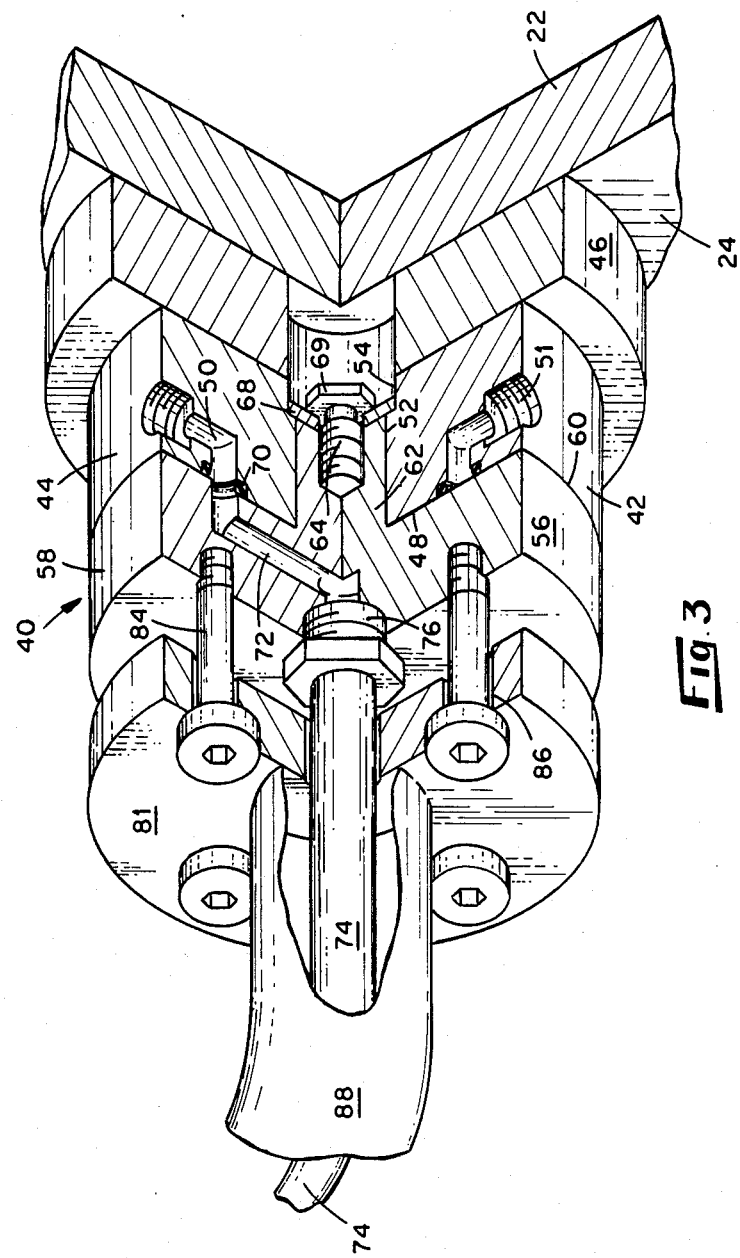
FIG. 3 is a perspective view taken generally along lines 3—3 of FIG. 2 showing details of the rotary, directional valve assembly of the present invention which is utilized for directing machining coolant at a high pressure to the tool-workpiece interface for chip-breaking purposes.

In a typical operation of the rotary, directional valve of the present invention the turret 10 is rotatably indexed to place one of the tools 20 in a working relationship with the workpiece 12. As the machining of the workpiece is initiated the flow of the high pressure machining coolant is provided through the single passageway 72 and the port 50 aligned therewith to the tool holder 18 at station 37 where the machining coolant passes through the nozzle 80 for impingement against the workpiece 12 and tool 20 at the interface thereof to provide the desired chip breaking. The indexing of the turret 10 also indexes the valve system 40 to align the single passageway 72 with the port 50 in alignment with tool station 37. To provide this indexing step, relative rotation occurs between the manifold 42 and the header 56 by the rotation of the turret 10 while the header plate 58 is held stationary by an external arrangement as best shown in FIG. 3. A discoidal plate 81 coplanar with the header plate 58 is disposed about the conduit 74 near the plate 58 but at a location longitudinally spaced therefrom. This plate 81 is secured to the plate 58 by a bolting arrangement 82 wherein the bolts 84 are threadedly engaged with the plate 56 and are moveably received in suitable bores 86 in the plate 81 with the heads of the bolts 84 bearing against the surface of plate 81. With this arrangement relative longitudinal movement of plate 58 can occur along the rotational axis of the turret 10 with respect to plate 80 which remains stationary. This sliding arrangement of the header plate 58 also inhibits rotation of the header 56 while permitting indexing of the manifold 42 of the valve system 40. To maintain plate 81 stationary it is coupled to a pipe or conduit 88 which is disposed about the conduit 72 and fixedly attached to the plate 81 by welding or the like. This pipe 88 is attached to a non-indexing portion of the turret 10 so that the pipe 88 can hold the plate 81 longitudinally stationary during indexing of the turret and hold the header 56 in a fixed position during rotation of the turret 10 so that one of the ports 50 in the manifold in alignment with the tool 20 to be positioned at station 37 can be placed in registry with the single passageway 72 in the header plate 56.

The longitudinal space between the plates 58 is required for turret indexing in that during normal indexing of the turret 10, the turret 10 is displaced along the rotational axis of the turret for unlocking the ring gear and drive gear arrangement so that rotation of the turret 10 may occur. Once the desired extent rotation is achieved the turret 10 is returned to its initial longitudinal position and again locked in place. If such a longitudinal displacement is not required for indexing of the turret then the plate 81 and the bolting arrangement 82 could be eliminated and the plate 58 be directly secured to the pipe 88.

It will be seen that the present invention provides a mechanism by which undesirable ribbon-shaped cuttings or chips generated during the machining of workpieces by automated turret lathe equipment can be satisfactorily and automatically eliminated.

We claim:

1. A chip-breaking system in combination with an automated machining apparatus wherein a rotatable turret having a plurality of circumferentially spaced apart stations each supporting machine tool means is selectively rotated about an axis for positioning one of said machine tool means in a material-removing relationship with a work piece, said chip-breaking system comprising nozzle means carried by each of said machine tool means, a valve assembly comprising manifold means supported by the turret for rotation therewith about said axis and having a plurality of circumferentially spaced apart passageways therein, header means carried by said manifold means and relatively stationary with respect thereto, said manifold means and said header means respectively comprising first and second plate means longitudinally positioned on the rotational axis and having contiguously disposed planar surfaces located therebetween with each of said passageways being radially spaced from said axis and having one end thereof in registry with the planar surface on said first plate means, means for maintaining the planar surfaces in juxtasposition while permitting relative rotation therebetween, third plate means axially spaced from said second plate means, means coupling said third plate means to said second plate means for preventing rotation of said second plate means about said axis and for providing longitudinal displacement of said second plate means with respect to said third plate means, a plurality of conduit means each having one end thereof in registry with the planar surface on said manifold means and each coupling one of said passgeways in said manifold means to one of said nozzle means, conduit means coupled to said header means for preventing rotation thereof about said axis, a single passageway in said header means extending through said second plate means with one end thereof in registry with said axis and with the other end thereof in registry with the planar surface on said header means and a selected one of said passageways in said manifold means upon rotation of said turret, seal means disposed about each of said passageways at the interface between said planar surfaces, and further conduit means coupled to said header means for serially conveying a liquid through said conduit means coupled to said header means and said single passageway, the selected one of said passageways in a manifold means in registry with said single passageway, one of said plurality of said conduit means, and one of said nozzle means for impingement upon the tool means and the work piece at the interface thereof for breaking chips formed during material removal, said further conduit means including pipe means disposed thereabout and secured to said third plate means for preventing rotation thereof about said axis.

2. A chip-breaking system as claimed in claim 1 wherein the means coupling said third plate means to said second plate means comprises a plurality of bolt means secured to said second plate means and extending in a slidable manner through said third plate means.

* * * * *